United States Patent [19]
Larkin

[11] 3,807,777
[45] Apr. 30, 1974

[54] EXPANSION JOINT ASSEMBLY
[75] Inventor: Dennis J. Larkin, Louisville, Ky.
[73] Assignee: Celanese Corporation, New York, N.Y.
[22] Filed: Apr. 10, 1972
[21] Appl. No.: 242,778

[52] U.S. Cl................. 285/302, 285/347, 11/423
[51] Int. Cl........................................... F16l 15/02
[58] Field of Search................... 285/302, 347, 423

[56] References Cited
UNITED STATES PATENTS

| 3,131,642 | 5/1964 | Geer et al. | 285/302 X |
| 3,433,506 | 3/1969 | Crowe | 285/302 X |
| 3,148,732 | 9/1964 | Gage | 285/302 X |

FOREIGN PATENTS OR APPLICATIONS

| 237,895 | 9/1960 | Australia | 285/302 |
| 524,935 | 8/1940 | Great Britain | 285/302 |

Primary Examiner—Dave W. Arola
Attorney, Agent, or Firm—Thomas J. Morgan; Linn I. Grim; Marvin Bressler

[57] ABSTRACT

An expansion joint assembly for pipe lines and similar type conduits subject to temperature caused expansion and contraction movement. The expansion joint assembly has particular application in conduits subject to significant axial expansion and contraction such as plastic pipes.

26 Claims, 2 Drawing Figures

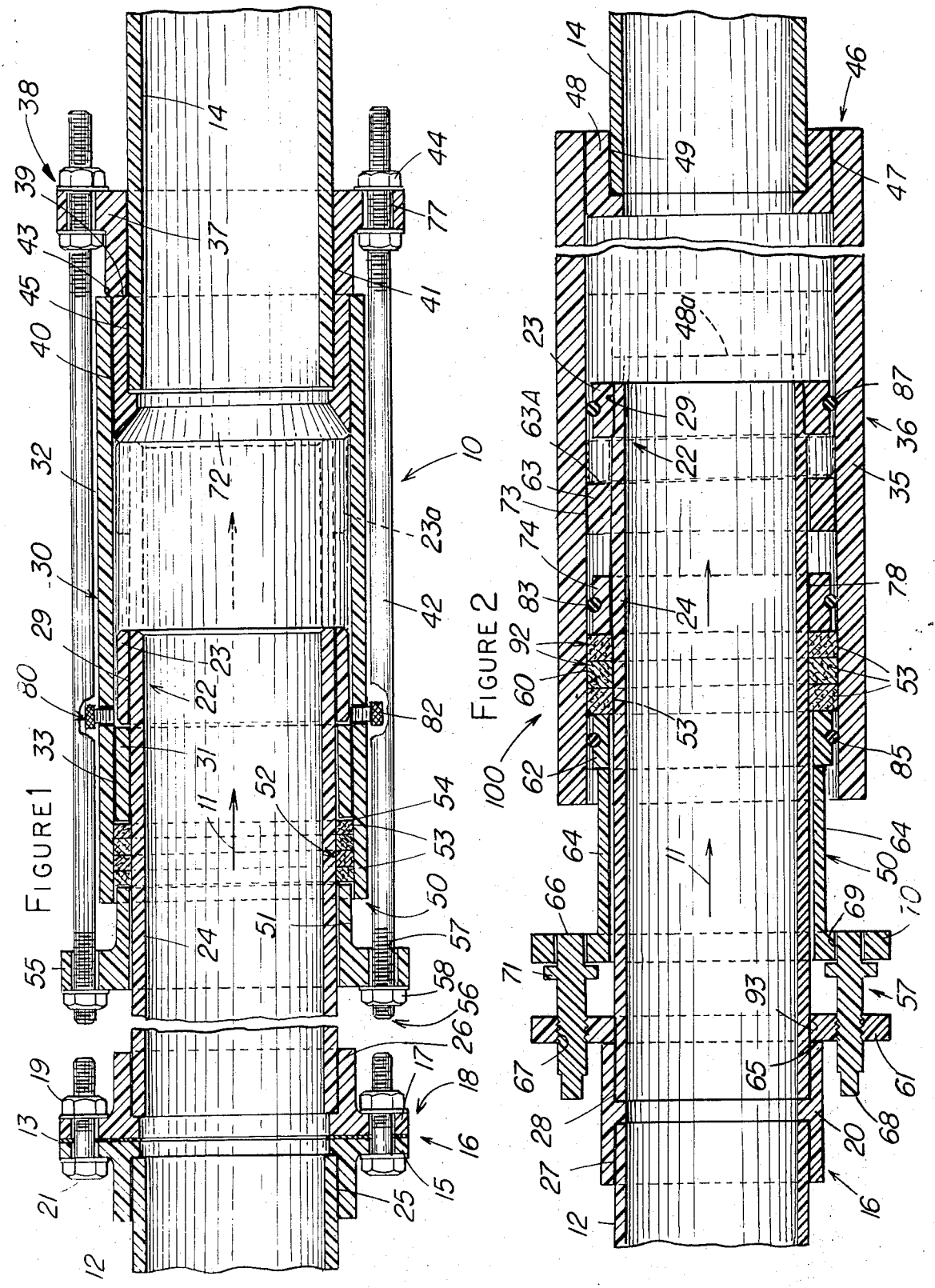

EXPANSION JOINT ASSEMBLY

BACKGROUND OF THE DISCLOSURE

1. Field of the Invention

The instant invention is directed to an expansion joint assembly for pipe lines and similar type conduits. More particularly, the instant invention is directed to a plastic expansion joint assembly for the fastening together of conduit members subject to significant thermally caused expansion and contraction. Still more particularly, the instant invention is directed to an expansion joint assembly for joining together of plastic conduit members.

2. Description of the Prior Art

It has long been the practice to employ expansion joints in long pipe lines, conduits and the like in which sections of pipe, conduits and the like are fastened together by an expansion joint assembly with provision made for axial expansion and contractions due to temperature variations. In the past, pipes and conduits of the type employed in long pipe lines were usually constructed of ferrous or non-ferrous metals. Thus, even when such pipe lines were subjected to wide temperature variations the relatively low coefficient of thermal expansion of the metal pipe would limit the amount of expansion and contraction to relatively short axial distances.

The recent proliferation of materials other than metals for use in pipe lines and other conduit applications has magnified the problem of thermal expansion and contraction and added a new dimension to the design of expansion joints. The new pipe line materials are primarily plastics which generally have high coefficients of thermal expansion. For instance, it is not unusual to find plastic pipe having a coefficient of thermal expansion five to ten times that of ferrous or non-ferrous metal pipes.

Several designs have been proposed to solve this problem of thermal expansion and contraction. One solution has been the design of plastic pipe provided with corrugated type creases which expand and contract in accordian-like style with change in temperature. This method meets with some success but upon stretching the stretched corrugated portion has a wall strength lower than that of the unstretched portions of the pipe. Moreover, the continued accordian style movement often results in fatigue-caused failure.

Expansion joints provided with packing seals are usually employed to join metal pipes and conduits. This type of joint is not subject to the disadvantages of corrugated plastic pipes. However, the packed seal expansion joints of the prior art, because they are designed for the expansion of metal pipes, are not capable of accommodating the large thermally caused movements typical of plastic pipe.

Expansion joints of the packed seal type due to their metal construction are furthermore inappropriate for use, in many applications, for the joining together of plastic and similar type conduits due to the particular applications to which plastic conduits are put. Plastic pipes are particularly suited for service with corrosive and other chemically reactive fluids. As is well known in the art, plastic pipes are often inert to chemically react fluids which corrode metal pipes. Thus, when chemically reactive fluids flow through plastic conduits it is particularly important that the expansion joint assembly employed be likewise inert to the fluid flowing across its inside walls. Obviously, a metal expansion joint will oftentimes not satisfy this requirement.

In summary, the expansion joint art is in need of a new joint particularly designed for use in the fast growing plastic pipe field.

BRIEF SUMMARY OF THE INVENTION

The instant invention is directed to an expansion joint assembly particularly designed for the joining of two conduit members having a high coefficient of thermal expansion.

In accordance with the instant invention an expansion joint assembly, preferably constructed of plastic, is provided. The assembly, which joins a first conduit member to a second conduit member, includes a first connecting means which connects the first conduit member to an inner annular assembly. An outer annular assembly is disposed about the inner annular assembly. The second conduit member is connected to the expansion joint assembly by a second connecting means which connects the second conduit member to the outer annular assembly. The expansion joint assembly is provided also with sealing means to prevent leakage. The sealing means includes a packing means disposed between the inner and outer annular assemblies as well as a packing adjustment means for adjusting the packing means as a function of the tightness of the seal required. An expansion limiting means and a contraction limiting means are also part of the expansion joint assembly. These means disposed on the inner and outer annular assemblies limit the axial movement of the joint due to temperature changes.

In operation, either the inner or outer annular assembly is moveable and the second assembly stationary. Preferably, the inner annular assembly is moveable and the outer assembly stationary in the event that the joint assembly is constructed of thermoplastic materials. If the expansion joint assembly is constructed of thermosetting plastic material the outer annular assembly is preferably moveable and the inner annular assembly is stationary.

BRIEF DESCRIPTION OF THE DRAWINGS

The instant invention may be better understood by reference to the accompanying drawings of which:

FIG. 1 is a sectional elevation view of a preferred embodiment of the expansion joint of the instant invention; and FIG. 2 is a sectional elevation view of another preferred embodiment of the expansion joint of the instant invention.

DETAILED DESCRIPTION

Turning now to the drawings in detail, FIG. 1 illustrates a preferred embodiment of the expansion joint assembly of the instant invention. This preferred joint is generally indicated at 10. The expansion joint assembly 10 fastens together two conduit members 12 and 14 which are connected to the expansion joint assembly. A first connecting means 16 connects the upstream conduit member 12 (assuming a direction of flow denoted by the arrow 11) to the upstream end of the expansion joint assembly 10. In the preferred embodiment illustrated in FIG. 1, the first connecting means 16 comprises a flange means 18 including a pair of flanges 15 and 17 connected together by bolts 21 and nuts 19. A suitable gasket 13 is disposed between the flanges 15 and 17 to prevent leakage.

In a second preferred embodiment, depicted in FIG. 2, another preferred expansion joint assembly 100 is provided with an alternate first connecting means 16. In this embodiment a coupling means 20 is provided to connect the upstream conduit member 12 to expansion joint 100.

In both embodiments, the first connecting means 16 is connected to the conduit member 12 and an inner annular assembly 22. In the preferred embodiment illustrated in FIG. 1, the inner annular assembly 22 of the expansion joint assembly comprises a tubular member 24 to which an annular collar 23 is attached at the downstream end thereof. In the second preferred embodiment of FIG. 2 the assembly 22 additionally includes an annular member 74 disposed upstream of the collar 23.

As discussed above the conduit members, 12 and 14 are preferably of plastic construction. Plastic construction provides advantages over metal construction in the preferred case where the conduit members joined are plastic. Expansion joint assemblies, even if not constructed of the same plastic as the pipe or conduit members they connect, thermally expand and contract at a rate closer to that of plastic conduit members than does most metals.

In addition, plastic members may be fastened to each other easily and efficiently. On the other hand, fastening of metal to plastic is oftentimes difficult and does not always result in as firm a seal as plastic to plastic fastening. The excellent fastening properties of plastic to plastic result from the ability of many plastic materials to be sealed together. The sealing of plastic parts may take several forms. For instance, when certain types of thermoplastic materials are employed, the plastics are solvent welded together. For example, PVC is often fastened in this fashion. When thermosetting materials are used, parts are typically cemented as by using an epoxy or other similar cement. Certain types of plastic do not fit in either category, that is, they cannot be solvent welded or cemented. These plastics are effectively fastened together by thermosealing which is a term denoting a heat fusing operation. Typical of such plastics are certain thermoplastics such as polypropylene. Of course, plastics may be fastened by mechanical means such as by spring clipping or screwing. This method may be employed, but is is usually limited to plastics that cannot be solvent welded or cemented.

Pursuant to the above remarks, flange faces 15 and 17 are connected to conduit member 12 and tubular member 24 by cement, solvent welds or the like denoted by 25 and 26. Similarly, the coupling means 20 is connected to conduit member 12 and the tubular member 24 by fastening means 27 and 28 respectively. In addition, the annular collar 23 is fastened to the annular tube 24 by solvent weld, cement seal or thermoseal 29.

In order to simplify the disclosure, hereinafter seals relating to the embodiment depicted in FIG. 1, which as will be described below are preferably constructed of a thermoplastic material, will be described as a solvent weld. Seals relating to the embodiment illustrated in FIG. 2 shall be hereinafter described as a cement seal in that it is usually constructed with thermosetting materials. It should be understood that this description is for simplicity of description and all the fastening means described above may alternatively be employed.

An outer annular assembly surrounds and cooperates with the inner assembly 22. In a preferred embodiment, illustrated in FIG. 1, the outer assembly, generally denoted at 30, comprises tubular member 32 disposed generally about the tubular member 24. In addition, the assembly 30 includes an annular sleeve 31 which is connected to the tubular member 32, preferably by solvent weld 33.

In a second preferred embodiment, the outer annular assembly 36 comprises a tubular shaped member 35 upon which is fastened a ring member 63. In this second embodiment, shown in FIG. 2, the outer assembly 36 is again disposed about the inner assembly 22.

The preferred expansion joint assemblies 10 and 100 of the instant invention include a second connecting means which connect the second conduit member 14 to the expansion joint assembly. As in the case of the first connecting means, the second connecting means assembly comprises, in a preferred embodiment depicted in FIG. 1 and indicated at 38, a flange 37, which is connected to the annular member 32 of the outer annular assembly 30, and a bushing 72, which will be discussed below, connected to the second conduit member 14. Subject to the remarks above, these connections are fastened together by solvent welds 43, 45, 40 and 41 which connect flange 37 and member 32; bushing 72 and conduit 14; bushing 72 and member 32 and flange 37 and conduit 14 respectively.

In a second preferred embodiment, a second connecting means generally indicated at 46 is employed. In this embodiment a reducer bushing 48, similar to bushing 72 of FIG. 1, is employed. The bushing 48, which has a second function to be described later, is connected on its outer face to the tubular member 35 of the outer annular assembly 36, preferably by cement seal 47, and on its inside face is connected, by cement seal 49, to the outside face and end of the conduit member 14.

Sealing means are provided to prevent leakage across the expansion joint assembly. A preferred sealing means assembly 50 is depicted in FIG. 1. The sealing means assembly 50 includes a packing means 52 which is preferably a plurality of packing rings 53 disposed in a packing gland 54. The packing gland 54 is defined radially by the outside wall of the annular tube 24 which defines the inside wall of the gland and by the inside wall of the tubular member 32 which defines the outside wall of the gland 54. The gland 54 is defined axially by the upstream end of the annular sleeve 31 which defines the downstream end of the gland 54 and by the downstream end of a packing adjustment sleeve 51, to be described below, which forms the adjustable upstream end of the gland 54. The sealing means assembly 50 additionally includes a packing adjustment means 56. The packing adjustment means 56 comprises a pack draw ring assembly which includes a plurality of threaded rods 42 and a flange 55 provided with a plurality of apertures 57. A plurality of nuts 58 each disposed on the upstream end of each rod 42 are also provided. The number of holes 57 employed is of course equal in number to the number of tie rods 42 and nuts 58 utilized. The flange 55 includes an integrally extending shoulder portion which has been described above by its function, the packing adjustment sleeve 51. The tie rods 42 are anchored on the flange 37 by means of a plurality of holes 77 disposed thereon on pairs of nuts 44 tightened on both faces of the flange 37.

A second preferred embodiment of the sealing means assembly 50 is provided in the embodiment illustrated in FIG. 2. In this embodiment a packing means 92 is provided which includes a packing gland 60 defined radially by the tubular member 24, and the tubular member 35 and axially by the annular member 74 and an adjustable axial boundary, annular collar 62, integral with and disposed at the downstream end of a packing adjustment sleeve 64. The packing means 92 also includes the packing which again is preferably a plurality of packing rings 53. A packing adjustment means 57 is also provided. It includes a flange assembly. The assembly comprises a fixed flange 61 connected, preferably by cement seals 93 and 65, to the tubular member 24 and the coupling means 20 respectively. Disposed through a plurality of holes 67 are a plurality of packing adjustment rods 66. The upstream end of the rods 66 are provided with means for adjustment. In a preferred embodiment these adjustment means comprises a wrench flat 68. The rod 66 pushes against a second moveable flange, the packing adjustment flange 70. The flange 70, which is integral with the packing adjustment sleeve 64, moves in the axial direction in direct proportion to the movement of the rod 66. The rods 66 move the flange 70 by means of an annular collar 71 which abut against the moveable flange 70. A plurality of apertures 69 accommodate the ends of rod 66 to maintain axial alignment of the rods 66.

The expansion joint assemblies 10 and 100 are additionally provided with an expansion limiting means. The means in one preferred embodiment (FIG. 1) includes the aforementioned reducer bushing 72. The bushing 72, connected to the outer assembly 30, the flange 37, and the conduit 14 preferably by solvent welds 40, 39 and 45 respectively, acts to limit downstream axial movement due to thermal expansion of the inner cylindrical tube 24 of the inner assembly 22. The bushing 72 is effective to this end because of the presence of the annular collar 23 of the inner assembly 22 which is blocked by the bushing 72.

The expansion joint assembly 10 is additionally provided with a contraction limiting means to limit upstream axial movement due to thermal contraction. These means are provided by the annular sleeve 31 of the outer annular assembly 30 which blocks upstream movement of the inner tubular member 24 by again blocking the collar 23 attached to the tube 24 of the inner annular assembly 22.

In a modified embodiment disclosed in FIG. 2, a second preferred expansion and contraction limiting means is provided. It includes the ring member 63 connected to the annular member 35 of the outer annular assembly 36, preferably by cement seal 73, and the previously discussed reducer bushing 48, attached on its outside face, preferably by cement seal 47, to the member 35. These components contribute to limiting of axial movement due to contraction and expansion, respectively, of the movable outer axial assembly 36. The annular collar 23, connected to the annular member 24, provide the constraint which limits downstream and upstream axial movement of the tubular member 35 by abutting against the ring 63 and the bushing 48, respectively.

In a preferred embodiment, an additional desirable feature may be provided in the expansion joint of the instant invention. This is a cleaning assembly. In many expansion joints a serious problem is created by accumulating dirt, debris and the like which tend to foul the joint and make necessary costly cleaning operations. In the instant invention, for example, in expansion joint assembly 10 dirt may, after long periods of time, accumulate between the outer and inner annular assemblies 30 and 22. To overcome this problem dirt accumulation is prevented by a cleaning means assembly 80 preferably included in the expansion joint assembly 10. In a preferred embodiment, the assembly 80 comprises the collar 23 of the inner annular assembly 22, which impinges against the inner wall of the cylindrical tube 32 of the outside annular assembly 30 and a plurality of flush plugs 82 situated in the wall of member 32 of the outer assembly 30. During axial upstream movement of the inner assembly 22 due to contraction, the collar 23 by squeegee-like action pushes accumulated dirt and debris out of the joint through the flush plugs 82, disposed at the top and bottom of the joint assembly 10.

The preferred embodiments of the instant invention make possible two modes of operation. The preferred mode of operation is a function of the material of construction of the expansion joint. Although it has been previously mentioned that the expansion joint assemblies 10 and 100 are preferably constructed of plastic, plastic are of two general classes, thermoplastic and thermosetting. Generally, thermoplastic plastic pipe and conduits have smooth uniform outside diameters and a less smooth, less uniform inside diameter. On the other hand, thermosetting plastic pipe has a smooth, uniform inside diameter and a less smooth, less uniform outside diameter. Obviously, it is preferable that the smoother, more uniform surface be moveable. In the expansion joint assembly of the instant invention either the inner or outer annular assembly is moveable in response to thermal expansion or contraction of the plastic conduits while the other assembly remains stationary. The moveable assembly, as is to be expected, should be provided with a smooth, uniform, relatively friction-free surface in order to prevent damage and to provide rapid response to temperature variations. Thus, in those cases where a thermoplastic material is employed as the material of construction for the expansion joint assembly of the instant invention, the assembly is operated with a moveable inside annular assembly. Similarly, where thermosetting material is used the outside annular assembly moves in response to thermal expansion and contraction.

The operation of an expansion joint assembly constructed of thermoplastic material is illustrated by the expansion joint assembly 10 of FIG. 1. Initially bolts 19 are tightened to fasten the upstream conduit 12 to the assembly 10. Sealing of the expansion joint assembly 10 is provided by the tightening of nuts 58, on the rods 42 against the moveable flange 55 which moves the packing adjustment sleeve 51 in the downstream direction to thus compress the packing rings 53 against the annular collar 31. As the temperature is increased the inner annular assembly 22 moves downstream. As stated above, the OD of thermoplastic conduits are smooth and uniform. Thus, the OD of the tube 24 moves smoothly over the inside face of the sleeve 51, the rings 53 and the sleeve 31. Downstream movement is constrained by bushing 72 abutting against collar 23. The phantom lines indicate the position of the assembly 10 at maximum expansion. In phantom, the collar 23a abuts against the stationary bushing 72. Similarly contraction, resulting in upstream movement of the inner assembly 22 is limited by the stationary sleeve 31. Solid lines indicate the position of the assembly at its most contracted position with the collar 23 abutting against the sleeve 31. It should be appreciated that the expansion joint assembly 10 is designed to accommodate the maximum expansion and contraction movement anticipated.

Among the thermoplastic materials that may be employed in the construction of the expansion joint assembly of the instant invention are polyolefins, such as polyethylene and polypropylene, polyvinyl chloride, modified polyvinyl chlorides, such as chlorinated polyvinyl chloride, as well as other thermoplastics that are within the contemplation of those skilled in the art.

A typical expansion joint assembly employing a thermosetting plastic construction is illustrated in the assembly 100. In the assembly 100 the smooth inside (ID) face of the annular member 35 of the outer assembly 36 moves, so that the outer annular assembly 36, rather than the inner annular assembly 22, is moveable.

In operation, the conduits 12 and 14 are connected, preferably by cement seals, to the expansion joint assembly 100 by the coupling means 20 and the bushing 48. In this embodiment sealing to prevent leakage is accomplished by the tightening of the packing adjustment rods 66, such as by a wrench fitted over the wrench flat 68, which pushes the flange 70 in the downstream direction. This causes corresponding downstream movement in the sleeve 64, which is integrally part of the flange 70, to thus compress the packing rings 53 against the stationary annular member 74.

In the event of conduit member expansion the outer annular assembly 36 moves in an upstream direction. The maximum expansion occurs when the bushing 48 abuts up against the stationary collar 23. This is indicated in phantom lines with the bushing position indicated as 48a. During contraction the outer assembly 36 moves in the downstream direction. Maximum allowable contraction occurs when the annular member 63 abuts against the stationary annular collar 23 of the inner annular assembly 22. This is again indicated in phantom lines with annular member 63 indicated as 63a.

The above description clearly suggest that the smooth inside surface of the tubular member 35 comes in contact with stationary objects as it indeed does. As shown in FIG. 2, wear rings 83, 85 and 87 are disposed between the annular collars 63, 52 and 23, respectively, and the inside surface of the tubular member 35. These rings function to prevent contact between the elements which the rings separate, rather than to provide a seal. These rings are preferably provided in those applications where the thermosetting material is particularly abrasive. Exemplary of particularly abrasive materials is fiberglass reinforced thermosetting plastic which, although having a uniform inside face, are so abrasive as to score and abrade materials which come in contact with it. Thus, the wear rings are optionally disposed as shown in the drawing to prevent abrasion of the inside surface of the tubular member 35. It should be noted that ring member 74, attached to the annular member 35 by cement seal 78, does not contact the outer diameter of tubular member 24 and hence does not require a wear ring.

Among the preferred thermosetting plastic materials that may be used in the construction of the instant invention are vinyl ester, thermosetting polyesters and epoxys. Other preferred thermosetting materials used include the above thermoplastics in combination with fiberglass. It is, of course, obvious that the above named thermosetting plastics are illustrative and are not intended as proscribing the thermosetting materials that may be employed in the instant invention.

Although two preferred embodiments are disclosed, features of the embodiments may be interchanged to provide further preferred embodiments. For example, flange means may be substituted for the coupling means in the assembly 100 to provide another embodiment. Also flush plugs may be provided in assembly 100. Thus, many further embodiments, both based on the disclosed preferred embodiments as well as other embodiments, within the scope and spirit of the instant invention are within the contemplation of the instant invention. The scope of the instant invention should, therefore, be limited only by the appended claims.

What is claimed is:

1. An expansion joint assembly for the joining together of a first and a second conduit member comprising:
   an inner annular assembly;
   a first connecting means connecting said first conduit member to said inner annular assembly;
   an outer annular assembly disposed about said inner annular assembly;
   a second connecting means connecting said outer annular assembly to said second conduit member;
   a sealing means assembly including packing means disposed between said inner and said outer annular assemblies and a packing adjustment means, provided with means for adjusting said packing means;
   a cleaning means assembly, operable during operation of said expansion joint assembly, disposed on said inner and outer annular assemblies; and
   an expansion limiting means and a contraction limiting means provided on said inner and said outer annular assemblies.

2. An expansion joint assembly in accordance with claim 1 wherein the material of construction of said assembly is a plastic.

3. An expansion joint assembly in accordance with claim 2 wherein the material of construction of said expansion joint assembly is a thermoplastic plastic.

4. An expansion joint assembly in accordance with claim 2 wherein the material of construction of said expansion joint assembly is a thermosetting plastic.

5. An expansion joint assembly in accordance with claim 4 wherein said thermosetting plastic is fiberglass reinforced.

6. An expansion joint assembly for the joining together of a first conduit member and second conduit member comprising:
   a moveable inner annular assembly comprising a tubular member provided with an annular collar disposed about the outside face of said tubular member;
   a first connecting means connecting said moveable inner annular assembly to said first conduit member;

a stationary outer annular assembly comprising a tubular member disposed about a portion of said inner annular assembly and provided with an annular sleeve on the inside face thereof;

a second connecting means comprising a bushing connected to said second conduit member and said tubular member of said outer annular assembly a sealing means assembly including packing means disposed between said inner and said outer annular assemblies and a packing adjustment means;

an expansion limiting means comprising said bushing connected to one end of said tubular member of said outer annular assembly which limits the movement of said annular collar connected to said tubular member of said inner annular assembly when said collar abuts against said bushing; and a contraction limiting means connected to said inner and outer annular assemblies to limit movement of said inner annular assembly due to thermal axial contraction of said first and second conduit members.

7. An assembly in accordance to claim 6 wherein the material of construction of said expansion joint assembly is plastic.

8. An assembly in accordance with claim 7 wherein said plastic is a thermoplastic.

9. An assembly in accordance with claim 6 including a cleaning means assembly provided on said inner and outer annular assemblies.

10. An assembly in accordance with claim 9 wherein said cleaning means assembly comprises said inner annular assembly, which includes an annular collar connected to a moveable annular member, and a plurality of flush plugs communicating between the inside and outside of said expansion joint assembly, disposed in the wall of a stationary tubular member of said outside annular assembly.

11. An assembly in accordance with claim 6 wherein said sealing means assembly includes a packing means disposed in a packing gland defined radially by said tubular member of said inner annular assembly, and said tubular member of said outer annular assembly and axially by said annular sleeve connected to said tubular member of said outer annular assembly and by said packing adjustment means.

12. An assembly in accordance with claim 11 wherein said packing adjustment means comprises a moveable flange means, said flange provided integrally with a moveable sleeve defining one axial boundry of said packing gland and providing the means by which said packing means is compressed against the stationary annular collar attached to said stationary tubular member of said outer annular assembly.

13. An assembly in accordance with claim 11 wherein said packing means comprises a plurality of packing rings.

14. An assembly in accordance with claim 6 wherein said first connecting means, comprises a flange means including a first flange connected to the outside face of said tubular member of said inner annular assembly at the end opposite the end on which said annular collar is disposed, fastened to a second flange connected to one end of said first conduit means.

15. An assembly in accordance with claim 6 wherein said bushing is connected to said second conduit member and said tubular member by solvent welds.

16. An assembly in accordance with claim 6 wherein said contraction limiting means comprises said annular collar attached to said tubular member of said inner annular assembly and said annular sleeve attached to said tubular member of said outer annular assembly which limits movement of said inner annular assembly.

17. An expansion joint assembly for the joining together of a first conduit member and a second conduit member comprising:

a stationary inner annular assembly comprising a stationary tubular member provided with an annular collar and an annular member, both connected to the outside face thereof;

a first connecting means connecting said stationary inner annular assembly to said first conduit member;

a moveable outer annular assembly disposed about said inner annular assembly, said outer annular assembly comprising a tubular member the tubular member provided with an annular collar connected to the inside face of said outer tubular member, and disposed downstream of said annular member connectd to said inner tubular member and upstream of said annular collar connected to said inner tubular member;

a second connecting means connecting said moveable annular assembly to said second conduit member;

a sealing means assembly including packing means disposed between said inner and said outer annular assemblies and a packing adjustment means provided with means for adjusting said packing means;

an expansion limiting means connected to said inner and outer assemblies to limit movement of said outer annular assembly due to thermal expansion; and a contraction limiting means connected to said inner and outer annular assemblies to limit movement of said outer annular assembly due to thermal contraction.

18. An assembly in accordance with claim 17 wherein the material of construction of said expansion joint assembly is plastic.

19. An assembly in accordance with claim 18 wherein said plastic is a thermosetting plastic.

20. An assembly in accordance with claim 19 wherein said plastic thermosetting plastic includes fiberglass.

21. An assembly in accordance with claim 18 wherein said first connecting means comprises a coupling means fastened to said first conduit member and said inner annular assembly.

22. An assembly in accordance with claim 17 wherein said packing adjustment means comprises a fixed flange connected to said inner tubular member; a plurality of threaded rods disposed in apertures provided on said fixed flange, said rods provided with an annular collar disposed about the outside face thereof; and a moveable flange, abbuting against said annular collar of said rods, having an integrally attached moveable adjustment sleeve which moves axially with said rods whereby said packing means is compressed or expanded.

23. An assembly in accordance with claim 22 wherein said packing means comprises a plurality of packing rings disposed in a packing gland defined axially by said moveable adjustment sleeve and said annular member attached to said tubular member of said inner annular assembly and radially by said tubular members of said inner and outer annular assemblies.

24. An assembly in accordance with claim 17 wherein said second connecting means comprises a bushing connected to said second conduit member and said tubular member of said outer annular assembly.

25. An assembly in accordance with claim 24 wherein said expansion limiting means comprises said annular collar of said inner annular assembly which limits movement of said moveable tubular member of said outer annular assembly by abutting against said bushing attached thereto.

26. An assembly in accordance with claim 17 wherein said contraction limiting means comprises said annular member attached to said outer annular assembly which limits movement of said tubular member of said outer annular assembly by abutting against said annular collar attached to said tubular member of said inner annular assembly.

* * * * *